(12) United States Patent
Leis et al.

(10) Patent No.: US 7,984,438 B2
(45) Date of Patent: Jul. 19, 2011

(54) VIRTUAL MACHINE TRANSITIONING FROM EMULATING MODE TO ENLIGHTENED MODE

(75) Inventors: Benjamin A. Leis, Seattle, WA (US); Jacob Oshins, Seattle, WA (US); Parag Chakraborty, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1112 days.

(21) Appl. No.: 11/349,795

(22) Filed: Feb. 8, 2006

(65) Prior Publication Data
US 2007/0198243 A1    Aug. 23, 2007

(51) Int. Cl.
*G06F 9/455* (2006.01)
(52) U.S. Cl. ............ 718/1; 718/108; 712/228; 712/229; 703/23
(58) Field of Classification Search ............... 703/23–28; 718/1; 719/319–328
See application file for complete search history.

(56) References Cited

U.S. PATENT DOCUMENTS

| | | | |
|---|---|---|---|
| 2002/0087732 A1* | 7/2002 | Boucher et al. | 709/250 |
| 2005/0044301 A1* | 2/2005 | Vasilevsky et al. | 711/1 |

* cited by examiner

*Primary Examiner* — Hyung S Sough
*Assistant Examiner* — Shih-Wei Kraft
(74) *Attorney, Agent, or Firm* — Woodcock Washburn LLP

(57) ABSTRACT

A computing device has a hardware device employed to provide a hardware service to the computing device and a plurality of virtual machines including a host virtual machine (VM-H) to which the hardware device is assigned, and a client virtual machine (VM-C) that can consume the hardware service by way of the VM-H. The VM-C includes an emulating stack and an enlightened stack. The emulating stack interfaces an application requesting the hardware service with a trap in a virtualization layer of the computing device which re-directs the request to the VM-H. The enlightened stack interfaces the application with the VM-H and bypasses the virtualization layer. The emulating stack includes a shunt driver that shunts to the enlightened stack each request from the application directed to the emulating stack.

10 Claims, 5 Drawing Sheets

VIRTUAL MACHINE TRANSITIONING FROM EMULATING MODE TO ENLIGHTENED MODE

TECHNICAL FIELD

The present invention relates to a method and mechanism employed by a virtual machine or the like operating on a computing device or the like to transition from one communications mode to another communications mode. More particularly, the present invention relates to providing such a method and mechanism that allows such a virtual machine to transition from communicating in an emulating mode, where requests from the virtual machine to a hardware device or the like are trapped and re-directed to another virtual machine for servicing, to communicating in an enlightened mode, where such requests from the virtual machine are directed to the another virtual machine by way of a communications path therebetween.

BACKGROUND OF THE INVENTION

As should be appreciated, a virtual machine is a software construct or the like operating on a computing device or the like for the purpose of emulating a hardware system. Typically, although not necessarily, the virtual machine is an application or the like and is employed on the computing device to host a user application or the like while at the same time isolating such user application from such computing device or from other applications on such computing device. A different variation of a virtual machine may for example be written for each of a plurality of different computing devices so that any user application written for the virtual machine can be operated on any of the different computing devices. Thus, a different variation of the user application for each different computing device is not needed.

Among other things, a virtual machine may require access to hardware associated with the computing device. As may be appreciated, such hardware may be any sort of hardware that can be associated with a computing device. For example, the hardware may be a storage device to store and retrieve data, and generally for any purpose that a storage device would be employed. Likewise, the hardware may be a resource such as a network, a printer, a scanner, a network drive, a virtual drive, a server, and the like. Note that whatever the resource may be, the hardware may be considered to be the resource itself, a hardware adapter for accessing the resource, and/or a combination thereof. Accordingly, whatever the resource may be, the virtual machine may in fact be provided with access to services provided by such resource.

New architectures for computing devices and new software now allow a single computing device to instantiate and run a plurality of partitions, each of which can be employed to instantiate a virtual machine to in turn host an instance of an operating system upon which one or more applications may be instantiated. Typically, although not necessarily, the computing device includes a virtualization layer with a virtual machine monitor or the like as an overseer application or 'hypervisor', where the virtualization layer oversees and/or otherwise manages supervisory aspects of each virtual machine, and acts as a link between each virtual machine and the world outside of such virtual machine.

In such a computing device with multiple partitions instantiated, any particular hardware device of the computing device may be dynamically assigned to a particular partition/virtual machine (hereinafter 'virtual machine' or 'VM') so that the particular VM can directly control such hardware device. Such particular VM, then, is in effect a host that provides hardware capabilities as a hardware host VM ('VM-H') that 'owns' the particular hardware device. Similarly, such VM-H provides hardware services to another VM which is in effect a client that consumes such capabilities as a hardware client VM ('VM-C'). Thus, the VM-C and the VM-H in combination accomplish operations that require use of the particular hardware device.

A particular VM-C operating on a computing device typically is constructed to operate as if a real machine. That is, the particular VM-C in accessing resources from a particular hardware device typically acts as if the particular hardware device is accessible by way of direct requests thereto. Accordingly, it may be the case that the VM-C has constructed a path or stack (hereinafter, 'stack') of drivers to which such requests are directed, with the expectation being that the particular hardware device is at the end of the stack. As has been established, however, the VM-C is not in fact a real machine and the particular hardware resource is not in fact at the end of the stack.

Accordingly, it is typically the case that a trap or the like at the virtualization layer is at the end of the stack. Thus, upon a request with regard to a particular hardware device being received at the trap of the virtualization layer, the virtualization layer re-directs the request to the VM-H that owns the particular hardware device. As may be appreciated, then, the VM-H and the virtualization layer in combination act to emulate the particular hardware device for the VM-C by intercepting all requests for the particular hardware device as generated by the VM-C and in effect mimicking the behavior of the particular hardware device for the VM-C. As a result, the VM-C is not aware that the particular hardware device is in fact being emulated and is not at the end of the 'emulating' stack.

Notably, emulating a particular hardware device by way of a trap or the like at the virtualization layer is cumbersome and inefficient. In particular, every request sent to the particular hardware device must follow a circuitous route through the virtualization layer, and is in fact sent from the VM-C and then re-sent as trapped from the virtualization layer to the VM-H. Accordingly, it is known that the VM-C may operate in an 'emulating' mode such as that set forth above, where the VM-C sends requests to the particular hardware device by way of an 'emulating' stack at the end of which is a trap at the virtualization layer, and also that the VM-C may operate in an 'enlightened' mode where the VM-C sends requests to the particular hardware device by way of an 'enlightened' stack at the end of which is a virtual machine bus or other communications path that connects the VM-C with the VM-H.

As may be appreciated, in the enlightened mode, the VM-C although operating as if a real machine is nevertheless aware that the particular hardware device is not accessible by way of direct requests thereto. Thus, the VM-C in the enlightened mode is aware that the particular hardware device can be accessed by way of the VM-H, and accordingly establishes a connection with the VM-H by way of the aforementioned enlightened stack and bus.

Significantly, the awareness of the VM-C in the enlightened mode is created by including within the enlightened stack one or more enlightened drivers that are 'aware' of being in a virtual machine. Specifically, each such enlightened driver does not generate hardware level calls directed to hardware, but instead generates VM-H calls for communicating with the VM-H by way of the bus or the like. In such a manner, every request sent to the particular hardware device by way of the enlightened driver in the enlightened stack follows a direct channel to the particular hardware device by way of the corresponding VM-H, and without being trapped and re-sent by the virtualization layer, as was the case with the emulating stack during emulating mode. As may be appreciated, by avoiding the virtualization layer, greater efficiency and manageability are achieved in the enlightened mode.

Typically, a VM-C that is 'enlightened' includes both the enlightened stack for use during the enlightened mode and also the emulating stack for use during the emulating mode. In particular, although the emulating stack would seem to be removable if the enlightened stack is instantiated, such emulating stack is still necessary for some operations of the VM-C. For one example, an operating system typically initially loads in the VM-C through a relatively simple loader that cannot be operated with the enlightened stack. For another example, if the operating system is crashing, it may be the case that post-crash dumps and other similar operations can only be performed by way of the emulating stack. For still another example, it may be the case that the same operating system image may be run in either the VM-C or inside of a physical machine. Since the physical machine would expose a physical hardware interface, the image would include software that could interact with either physical hardware or with an emulation. At any rate, even if the emulating stack were to be removed from the VM-C, there is likely nothing to prevent a user or application from creating such emulating stack. After all, such an emulating stack is known and the components thereof are readily available, and it is possible that certain already-existing applications include specific instructions that would create the emulating stack if not already present.

Note, though, that if the VM-C is provided with both an emulating stack and an enlightened stack, care must be taken to ensure that such stacks do not interfere with each other. Thus, a need exists for a method and mechanism to ensure that when the VM-C is in enlightened mode, all requests for the particular hardware device employ the enlightened stack. More particularly, a need exists for a method and mechanism by which requests for the particular hardware device directed to the emulating stack are processed through such emulating stack when the VM-C is in the emulating mode, and are diverted or shunted to the enlightened stack for processing when the VM-C is in an enlightened mode.

SUMMARY OF THE INVENTION

The aforementioned needs are satisfied at least in part by the present invention in which a computing device has a hardware device employed to provide a hardware service to the computing device and a plurality of virtual machines instantiated on the computing device. Each virtual machine hosts an instance of an operating system upon which one or more applications may be instantiated, and the virtual machines include a host virtual machine (VM-H) to which the hardware device is assigned such that the VM-H can host and directly control such hardware device and can provide the hardware service of the hardware device therefrom, and a client virtual machine (VM-C) that can access the VM-H and consume the hardware service of the hardware device as provided by such VM-H. The computing device also has a virtualization layer for overseeing and managing the VM-H and VM-C.

The VM-H includes a virtualization driver for receiving requests from the VM-C and initiating and performing hardware operations on behalf of the VM-C based on the requests, and a hardware stack for interfacing the virtualization driver with the hardware device and performing hardware operations with regard to the hardware device according to the requests received by the virtualization driver. The VM-C includes an application for transmitting a request for the hardware service of the hardware device, an emulating stack, and an enlightened stack.

The emulating stack is for interfacing the application with a trap in the virtualization layer of the computing device, and emulates performing of hardware operations with regard to the hardware device by way of the trap by transmitting the request of the application to the trap, whereby the virtualization layer re-directs the request received at the trap to the virtualization driver of the VM-H. The enlightened stack is for interfacing the application with the virtualization driver of the VM-H, and effectuates performing of hardware operations with regard to the hardware device by way of the virtualization driver of the VM-H by transmitting the request of the application to the virtualization driver of the VM-H, whereby the enlightened stack bypasses the virtualization layer. Significantly, the emulating stack includes a shunt driver for shunting to the enlightened stack each request from the application directed to the emulating stack, whereby the shunted request is further processed by the enlightened stack as if directed thereto by the application.

In an alternate embodiment, the enlightened stack is dispensed with. Instead, the shunt driver in the emulating stack shunts to the virtualization driver of the VM-H at least some of the requests from the application, whereby each shunted request bypasses the trap of the virtualization layer.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
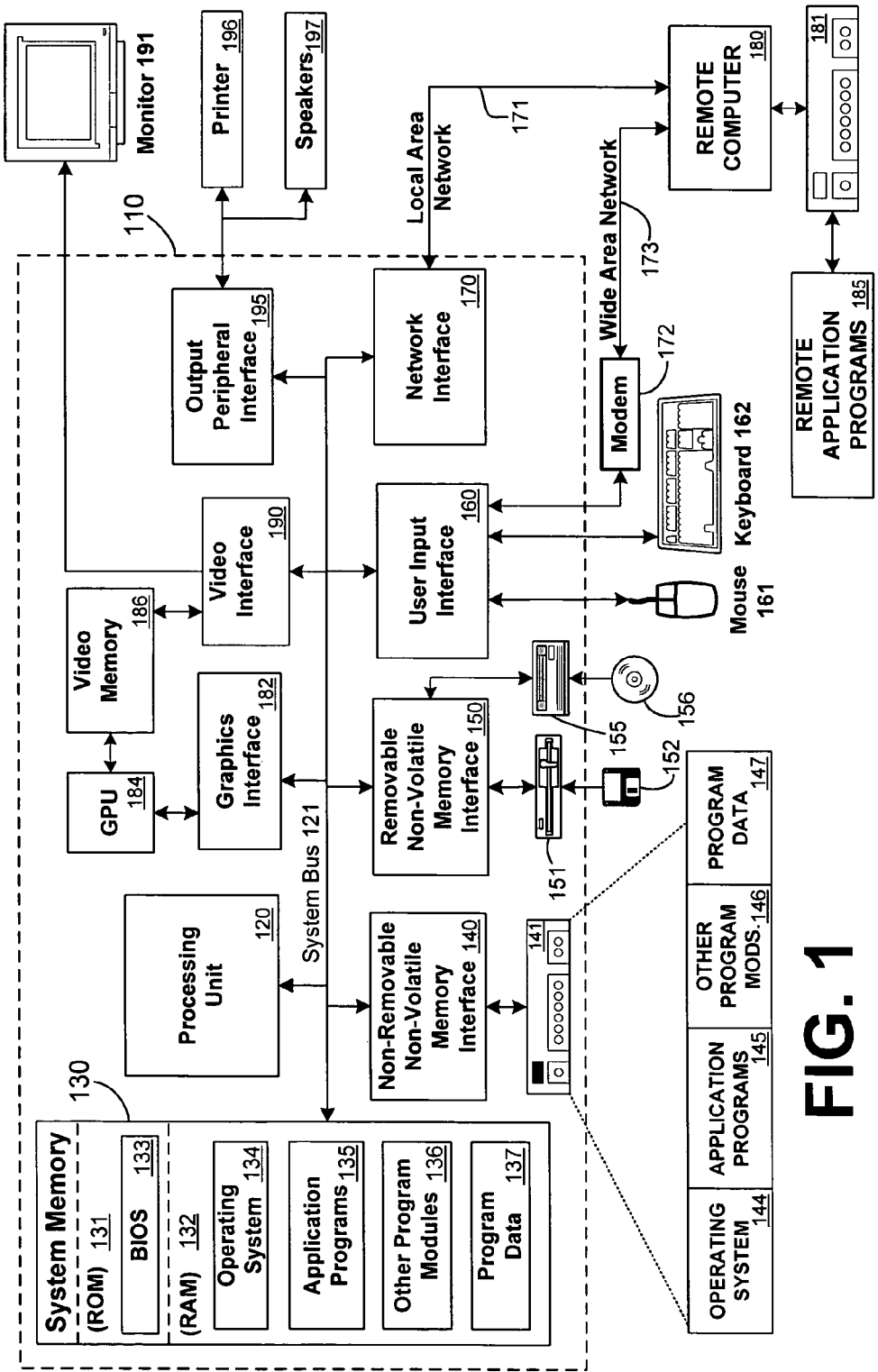
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI Express.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection or fiber optic connection, and wireless media such as acoustic, RF, infrared, optical, phased-array antenna operating at any wavelength, directional and non-directional electromagnetic emitters and receivers operating at any wavelength, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
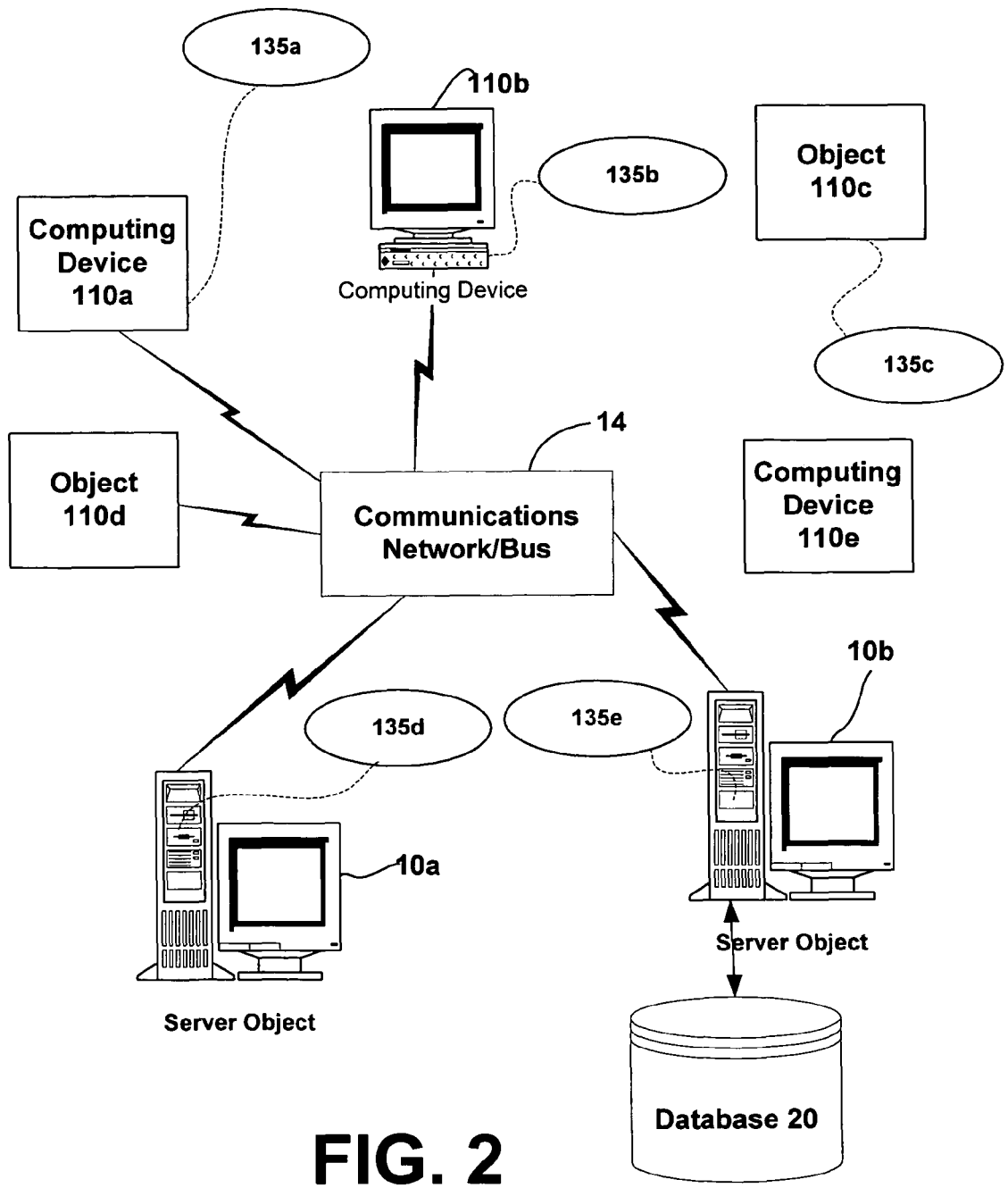
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wire-line or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers processing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source, and to any computing device with which it is desirable to render high performance graphics generated by a virtual machine.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices and databases 20.

Partitioned Computing Device

Figure 3:
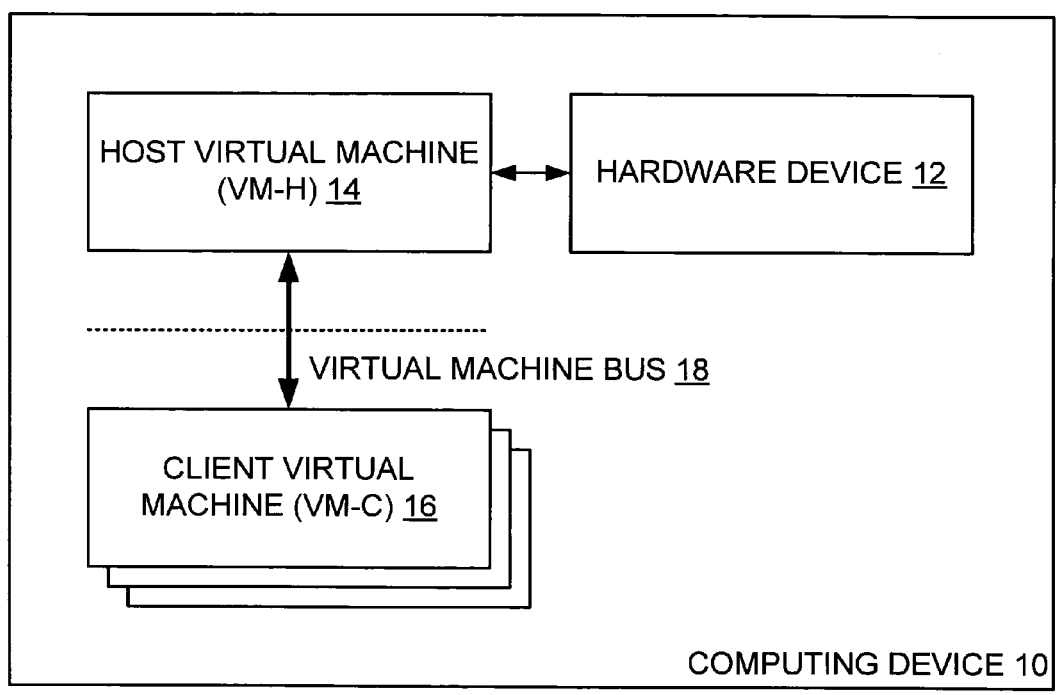
FIG. 3 is a block diagram showing a computing device running a plurality of partitions including a host partition with a virtual machine (VM-H) that owns a particular hardware device and provides hardware services therefor, and a client partition with a virtual machine (VM-C) that employs the hardware services of the VM-H in accordance with embodiments of the present invention.

Turning now to FIG. 3, a computing device 10 includes a particular hardware device 12 that is employed to provide a hardware service to the computing device 10. Such computing device 10, hardware device 12, and hardware service may be any appropriate computing device, hardware device, and hardware service without departing from the spirit and scope of the present invention. For example, the computing device 10 may be a personal computer such as a desktop or laptop computer or the like with a hard disk drive as the hardware device 12 providing data storage services. Likewise, the computing device 10 may be a portable playback machine such as a portable audio or video player with a display screen as the hardware device 12 providing display services. Similarly, the computing device 10 may be a server machine with a data communications network as the hardware device 12 providing communications services. Note that the hardware device 12 may be a particular piece of hardware, an adapter for accessing a particular piece of hardware, or a combination thereof.

Significantly, the computing device 10 has been configured to run a plurality of partitions, where each partition can be employed to instantiate a virtual machine to in turn host an instance of an operating system upon which one or more applications may be instantiated. As seen, in such computing device 10, the particular hardware device 12 of the computing device 10 is assigned to a particular partition or virtual machine 14 (hereinafter, VM 14) so that the particular VM 14 can directly control such particular hardware device 12. Such particular VM 14, then, is a host that provides hardware capabilities ('VM-H 14'). Similarly, such VM-H 14 provides hardware services to one or more other VMs 16, each of which is in effect a client that consumes such services ('VM-C 16'). Typically, each VM-C 16 and the VM-H 14 communicate by way of a pipe or channel such as a virtual machine bus 18 or the like to accomplish hardware-related operations, as will be set forth in more detail below.

Figure 4:
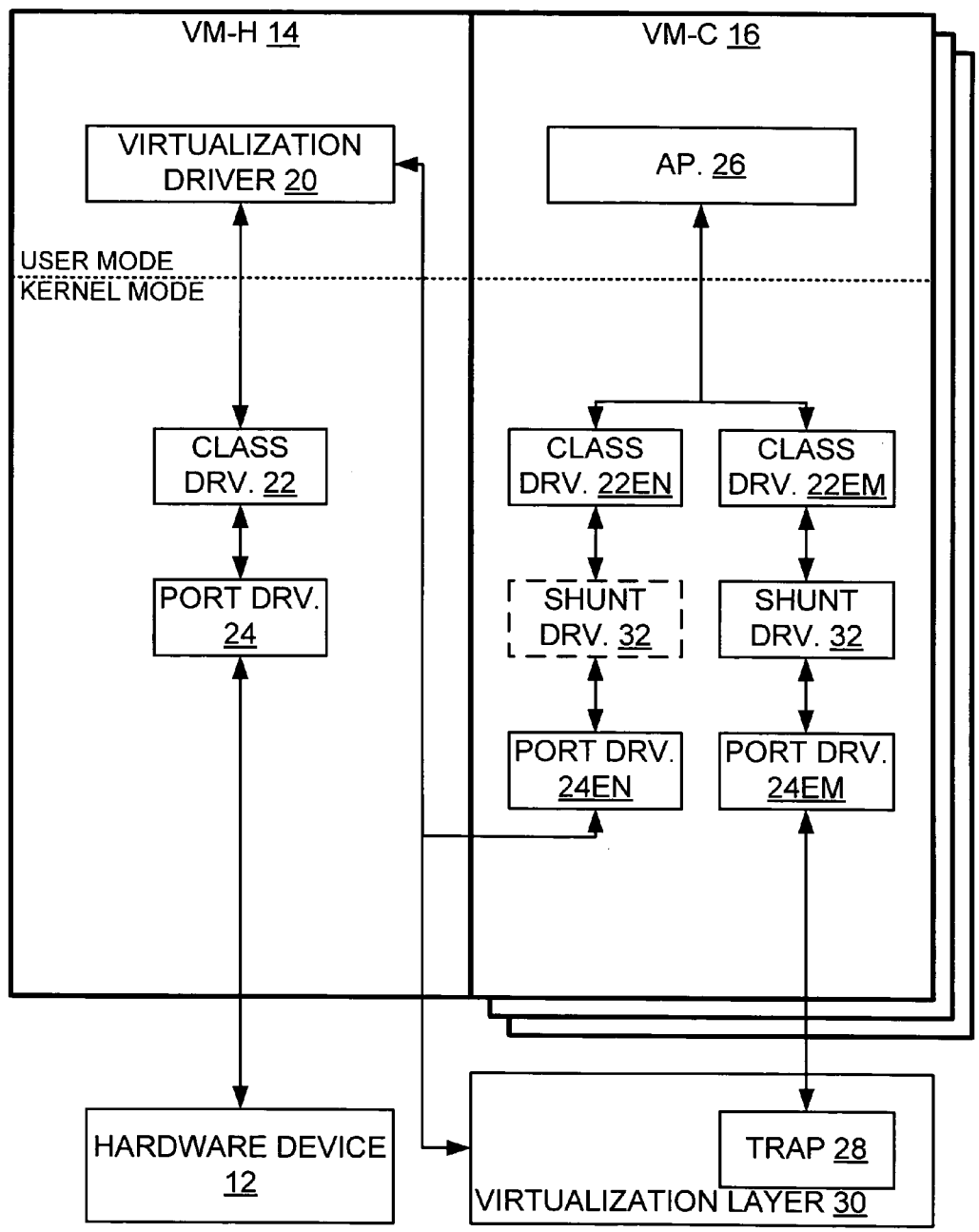
FIG. 4 is a block diagram showing the VM-H and VM-C of FIG. 3 in additional detail in accordance with one embodiment of the present invention.

Turning now to FIG. 4, it is seen that the VM-H 14 and each VM-C 16 include the following elements relating to initiating and performing hardware operations. FIG. 4 presumes that the computing device 10 of FIG. 3 and each VM 14, 16 thereof are functionally operated to include both a user mode and a kernel mode, although such modes are not perceived to be absolutely necessary for purposes of the present invention. At any rate, and as may be appreciated, the user mode is a generally non-privileged state where executing code is forbidden by the hardware from performing certain operations, such as for example writing to memory not assigned to such code. Generally such forbidden operations are those which could destabilize the operating system of the VM 14, 16 or constitute a security risk. In terms of the operating system, the user mode is an analogous non-privileged execution mode where the running code is forbidden by the kernel from performing potentially dangerous operations such as writing to system configuration files, killing other processes, rebooting the system, and the like.

As may also be appreciated, the kernel mode or privileged mode is the mode in which the operating system and related core components run. Code running in the kernel mode has unlimited access to the system memory and external devices that are assigned to the partitions 14, 16. Generally, the amount of code running in kernel mode is minimized, both for purposes of security and elegance. Roughly speaking, a user of a computing device 10 interfaces therewith most directly through the user mode and applications operating therein, while the computing device 10 interfaces with external devices, including the particular hardware device 12, most directly through the kernel mode.

With the user and kernel modes as set forth above, then, and still referring to FIG. 4, it is seen that in one embodiment of the present invention the VM-H 14 has in the user mode portion thereof a virtualization driver 20 for initiating and performing hardware operations on behalf of the VM-C 16. Thus, the virtualization driver 20 receives requests that originate from the VM-C 16 and forwards the request to the kernel mode of the VM-H 14 for further processing.

Correspondingly, the VM-H 14 has in the kernel mode portion thereof a hardware stack for accessing the particular hardware device 12 and performing hardware operations with regard to the particular hardware device 12. As may be appreciated, such hardware operations primarily include whatever reading and writing of data may be necessary to effectuate the hardware operations. As seen, the stack may include a class driver 22 and a port driver 24 that interfaces with the particular hardware device 12 by way of a direct connection, a network connection, or the like. In addition, the stack may include other drivers without departing from the spirit and scope of the present invention. As may be appreciated, the virtualization driver 20, the class driver 22, and the port driver 24 are known or should be apparent to the relevant public and therefore need not be set forth herein in any detail.

Still referring to FIG. 4, it is seen that for each VM-C 16 hosted by the VM-H 14, and particularly with regard to the aforementioned emulating mode, such VM-C 16 likely includes in the user mode portion thereof one or more applications 26 that require hardware services from the particular hardware device 12. Again, in such emulating mode, the VM-C 16 presumes a direct connection to the particular hardware device 12 for obtaining such hardware services, although in point of fact the particular hardware device 12 is to be accessed by way of the VM-C 16. However, and again, inasmuch as the VM-C 16 is a virtual machine, such hardware services are in fact performed by the VM-H 14 on behalf of the VM-C 16. At any rate, each such application 26 may of course be any application without departing from the spirit and scope of the present invention.

As may be appreciated, to implement the hardware services of the particular hardware device 12 at the VM-C 16 as a virtual machine, the kernel mode portion of such VM-C 16 may have an arrangement similar to that of the VM-H 14, with an 'emulating' stack that may include a class driver 22em and a port driver 24em. Here, and as was set forth above, the emulating stack presumes that requests therefrom are forwarded directly to the particular hardware device 12 at the end of such emulating stack. However, such requests from the emulating stack are in point of fact received at a hardware trap 28 or the like of a virtualization layer 30 or the like, where the virtualization layer 30 includes a virtual machine monitor or the like that oversees and otherwise manages the VMs 14, 16 of the computing device 10. Such a trap 28 and virtualization layer 30 are known or should be apparent to the relevant public and therefore need not be set forth herein in any detail.

Nevertheless, it should be understood that at least in the context of the present invention, the trap 28 is implemented at the virtualization layer 30 as the virtualization layer 30 suspending execution of at least a portion of the VM-C 16 when the VM-C 16 attempts a particular act such as sending the request to the hardware device 12. Thereafter, the virtualization layer 30 forwards state information surrounding the suspension and the request to the VM-H 14, and the VM-H 14 decides what to do in response to the operation that the VM-C 16 was attempting. The VM-H 14 then changes some aspect of the state information and sends a message back to the virtualization layer 30 specifying how to restart operation of the VM-C 16 in such a way that the VM-C 16 is unaware that the trap 28 has been actuated. Put simply, then, the trap 28 may not necessarily be a physical or virtual object but instead can characterize a response of the virtualization layer 30 without departing from the spirit and scope of the present invention.

At any rate, and as was set forth above, the virtualization layer 30 re-directs each request received at the trap 28 to the VM-H 14 that owns the particular hardware device 12, and in particular the virtualization driver 20 of the VM-H 14. Thus, the VM-H 14 and the virtualization layer 30 in combination act to emulate the particular hardware device 12 for the VM-C 16 and process the request.

Enlightened Stack in VM-C 16

As was pointed out above, emulating the particular hardware device 12 by way of a trap 28 at the virtualization layer 30 is cumbersome and inefficient for the reason that each request must be relayed through a circuitous route including the virtualization layer 30. Accordingly, it is known that the VM-C 16 may operate in an 'emulating' mode such as that set forth above, where the VM-C 16 sends requests to the particular hardware device 12 by way of the emulating stack, and also that the VM-C 16 may operate in an 'enlightened' mode where the VM-C 16 sends requests to the particular hardware device 12 by way of an 'enlightened' stack at the end of which is the bus 18 or other communications path that connects the VM-C 16 directly with the VM-H 14.

In the enlightened mode, the VM-C 16 is aware that the particular hardware device 12 is not accessible by way of direct requests thereto, but instead is accessible by way of the VM-H 14, and accordingly establishes a connection with the VM-H by way of the enlightened stack and the bus 18. It is seen that in one embodiment of the present invention the enlightened stack has an arrangement similar to that of the emulating stack, with a class driver 22en and a port driver 24en. Here, though, the enlightened stack presumes that the particular hardware device 12 is not at the end of such enlightened stack, and thus the port driver 24em forwards requests directly to the virtualization driver 20 of the VM-H 14 for further processing. Accordingly, with the enlightened stack, the request bypasses the virtualization layer 30 and need not be relayed therethrough.

Shunt Driver

As was set forth above, a VM-C 16 that includes an enlightened stack for use during an enlightened mode also typically includes an emulating stack for use during an emulating mode. Notably, although the emulating stack could be removed when the enlightened stack is instantiated, the better course of action is to leave the emulating stack in place based on both practical and historical considerations. However, leaving the emulating stack in place raises the possibility that the emulating stack can interfere with the operation of the enlightened stack. In particular, although all request regarding the particular hardware device 12 should now be directed to the enlightened stack, it is still nevertheless possible that such requests can be directed to the emulating stack instead.

Figure 5:
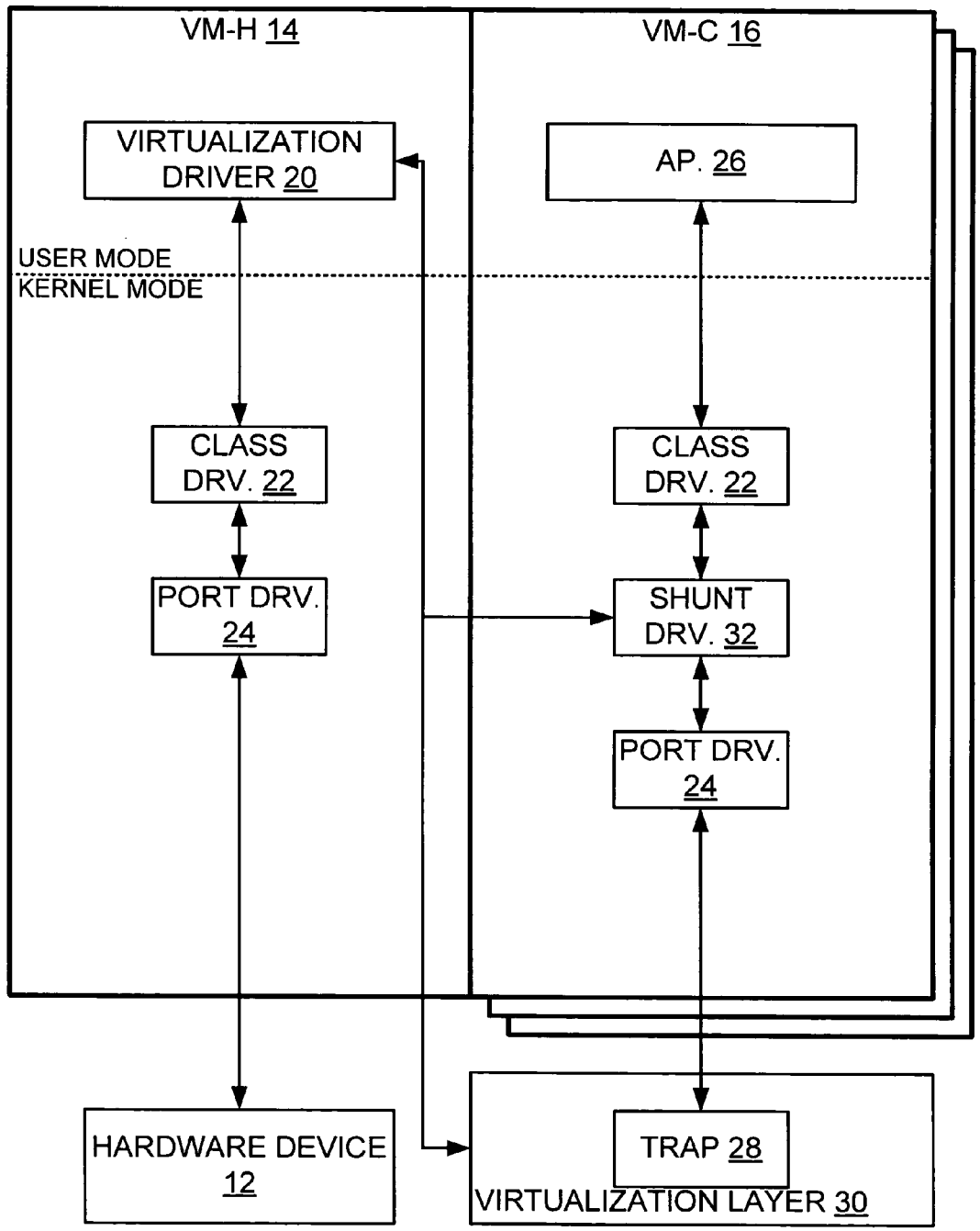
FIG. 5 is a block diagram showing the VM-H and VM-C of FIG. 3 in additional detail in accordance with an alternate embodiment of the present invention.

Accordingly, in one embodiment of the present invention, the emulating stack is provided with a shunt or shunt driver 32, whereby any request directed to the emulating stack during enlightened mode is shunted over to the port driver 24en of the enlightened stack for further processing. As seen in FIG. 5, the shunt driver 32 is positioned between the class driver 22em and the port driver 24em of the emulating stack. However, it is to be appreciated that the shunt driver 32 may alternately be positioned elsewhere within the emulating stack without departing from the spirit and scope of the present invention.

In one embodiment of the present invention, the shunt driver 32 is instantiated within the emulating stack when the enlightened stack is instantiated, with the result being that the instantiation of such enlightened stack and such shunt driver 32 in effect place the VM-C 16 into the enlightened mode. In such embodiment, the shunt driver 32 operates to shunt all requests to the enlightened stack.

In another embodiment of the present invention, the shunt driver 32 is instantiated along with the emulating stack and operates according to the mode of the VM-C 16. In particular, when in emulating mode, the shunt driver 32 operates to forward any request to the port driver 24em of the emulating stack for further processing. Likewise, when in enlightened mode, the shunt driver 32 operates to forward any request to the port driver 24en of the enlightened stack for further processing. As may be appreciated, such mode switching of the shunt driver 32 may be performed in any appropriate manner without departing from the spirit and scope of the present invention.

For example, the shunt driver 32 may receive as an input from some other portion of the VM-C 16 the mode thereof, and operate accordingly. Similarly, the shunt driver 32 may operate based on whether the enlightened stack and/or the port driver 24en thereof is instantiated. If so, it may be the default case for the shunt driver 32 to shunt a request to the port driver 24en of the enlightened stack unless such request is not accepted, such as for example may be the case when such port driver 24en is not instantiated. Alternately, it may be the case that the port driver 24en of the enlightened stack itself controls operation of the shunt driver 32 of the emulating stack. In any case, it is to be appreciated that the shunt driver 32 may be constructed and operated in any appropriate manner without departing from the spirit and scope of the present invention.

Note that just as the emulating stack is provided with the shunt driver 32 to shunt requests to the enlightened stack, so too may the enlightened stack be provided with a shunt driver 32 to shunt requests to the emulating stack or to another stack (not shown). Such a shunt driver 32 may be provided within the enlightened stack in a purposeful manner if it becomes necessary to shunt a request from the enlightened stack to another location. Alternatively, such a shunt driver 32 may be provided within the enlightened stack as an artifact if for example the enlightened stack is copied from the emulating stack. In the latter case, the shunt driver 32 in the enlightened stack exists but has no purpose and in particular performs no shunting function.

As was alluded to above, the emulating stack as a practical matter has no real purpose or use when the VM-C 16 is in the enlightened mode, and the shunt driver 32 in the emulating stack is thus employed to shunt requests to the enlightened stack when such requests should more properly have been directed to such enlightened stack. Accordingly, in one embodiment of the present invention, the shunt driver 32 in addition to the shunting function performs the additional function of suppressing any query from the VM-C 16 to discover information regarding the emulating stack, or at least that part of the emulating stack below such shunt driver 32. As may be appreciated, by so suppressing, at least an application at the user mode of the VM-C 16 cannot discover the emulating stack and use same. Such suppressing function thus acts to reduce the likelihood that requests will be directed to the emulating stack during the enlightened mode, at least from the user mode of the VM-C 16, and also acts to reduce the number of requests the shunt driver 32 in the emulating stack must shunt to the enlightened stack.

Turning now to FIG. 5, it is seen that in an alternate embodiment of the present invention, the shunt driver 32 is instantiated within the emulating stack to place the VM-C 16 into the enlightened mode, as before, but the enlightened stack is not likewise instantiated. Instead, in such alternate embodiment, the shunt driver 32 performs the function of the enlightened stack and thus shunts at least some requests from the VM-C 16 directly to the virtualization driver 20 of the VM-H 14.

Note that in such alternate embodiment, the shunt driver 32 may shunt all or less than all requests from the VM-C 16. in particular, it may be the case that the shunt driver 32 shunts only those requests that are considered to be primary, while allowing other requests that are not considered to be primary to pass through to the virtualization layer 30. As may be appreciated, such a distinction between primary and secondary requests may be based on the fact that the virtualization driver 20 of the VM-H 14 must include programming to receive and operate on each request as directly received from the shunt driver 32. However, such virtualization driver 20 should not be made more complex by encumbering same with excessive programming for dealing with every possible request. Instead, and as a matter of efficiency and elegance, the virtualization drive should only be encumbered with programming for dealing with primary requests, which may be identified as requests of primary importance and/or as requests that are to be most often received and/or requests that require the most effort to respond to, such as for example read and write requests and the like.

All other requests, then, may be identified as secondary requests that can be handled by the virtualization layer 30 in a less efficient and less elegant manner. As should now be evident, though less efficient and less elegant, handling secondary requests by way of the virtualization layer 30 is deemed acceptable based on the lesser importance of such requests and/or the lesser frequency of such requests and/or the lesser amount of effort needed for such requests.

Of course, identifying each request as being primary or secondary may be performed in any appropriate manner without departing from the spirit and scope of the present invention, presuming of course that both the shunt driver 32 and the virtualization driver 20 are appropriately programmed based on such differentiation. Moreover, a shunt driver 32 may be constructed to selectively shunt based on such a differentiation in any appropriate manner without departing from the spirit and scope of the present invention. Such a 'differentiating' shunt driver 32 should at least be apparent to the relevant public and therefore need not be set forth herein in any detail. Note, though, that such a differentiating shunt driver 32 is more complex than a corresponding 'non-differentiating' shunt driver 32 such as that shown in FIG. 4, and therefore requires additional programming to determine for each request whether to shunt and to in fact shunt or to pass through the request as appropriate based on the determination.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a method and mechanism is provided with regard to a VM-C 16 in an enlightened mode such that all requests for a particular hardware device 12 employ the enlightened stack of such VM-C 16. In such method and mechanism, requests for the particular hardware device 12 that are directed to the emulating stack of such VM-C 16 are processed through such emulating stack when the VM-C 16 is in an emulating mode, and are diverted or shunted to the enlightened stack for processing when the VM-C 16 is in an enlightened mode.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A computing device comprising:
a hardware device employed to provide a hardware service to the computing device;
a processor electrically coupled to said hardware device when said computing device is in an operational state;
a memory electrically coupled to said processor when said computing device is in an operational state, said memory having stored thereon computer-executable instructions that in response to execution cause:
a plurality of virtual machines to be instantiated on the computing device, each virtual machine for hosting an instance of an operating system upon which one or more applications may be instantiated, the virtual machines including:
a host virtual machine (VM-H) to which the hardware device is assigned such that the VM-H can host and directly control such hardware device and can provide the hardware service of the hardware device therefrom; and
a client virtual machine (VM-C), instantiated on the same computing device as the VM-H, that can access the VM-H and consume the hardware service of the hardware device as provided by such VM-H; and
a virtualization layer for overseeing and managing the VM-H and VM-C, the VM-H including:
a virtualization driver for receiving requests from the VM-C and initiating and performing hardware operations on behalf of the VM-C based on the requests; and
a hardware stack for interfacing the virtualization driver with the hardware device and performing hardware operations with regard to the hardware device according to the requests received by the virtualization driver;
the VM-C including:
an application for transmitting a request for the hardware service of the hardware device;
an emulating stack for interfacing the application with a trap in the virtualization layer of the computing device, the emulating stack for emulating performing of hardware operations with regard to the hardware device by way of the trap by transmitting the request of the application to the trap, whereby the virtualization layer redirects the request received at the trap to the virtualization driver of the VM-H; and
an enlightened stack for interfacing the application with the virtualization driver of the VM-H, the enlightened stack for effectuating performing of hardware operations with regard to the hardware device by way of the virtualization driver of the VM-H by transmitting the request of the application to the virtualization driver of the VM-H, whereby the enlightened stack bypasses the virtualization layer,
the emulating stack including a shunt driver for shunting to the enlightened stack each request from the application directed to the emulating stack when the VM-C is in enlightened mode, wherein each stack includes a class driver and a port driver, wherein the shunt driver in the emulating stack is positioned between the class driver and the port driver of such emulating stack and shunts the request to the port driver of the enlightened stack, whereby the shunted request is further processed by the enlightened stack as if directed thereto by the application.

2. The computing device of claim 1 wherein the hardware device is one of a piece of hardware and an adapter for accessing a piece of hardware.

3. The computing device of claim 1 wherein the VM-C and the VM-H can communicate by way of a virtual machine bus.

4. The computing device of claim 1 wherein the shunt driver is instantiated within the emulating stack when the enlightened stack is instantiated, whereby the instantiation of the enlightened stack and the shunt driver moves the VM-C from an emulating mode into an enlightened mode where the shunt driver operates to shunt all requests received thereat to the enlightened stack.

5. The computing device of claim 1 wherein an application in the VM-C transmits a query to the emulating stack to discover information regarding the emulating stack, and wherein the shunt driver suppresses the query, whereby such suppressing acts to reduce requests directed to the emulating stack.

6. A computing device comprising:
a hardware device employed to provide a hardware service to the computing device;
a processor electrically coupled to said hardware device when said computing device is in an operational state;
a memory electrically coupled to said processor when said computing device is in an operational state, said memory having stored thereon computer-executable instructions that in response to execution cause:
a plurality of virtual machines to be instantiated on the computing device, each virtual machine for hosting an instance of an operating system upon which one or more applications may be instantiated, the virtual machines including:

a host virtual machine (VM-H) to which the hardware device is assigned such that the VM-H can host and directly control such hardware device and can provide the hardware service of the hardware device therefrom; and a client virtual machine (VM-C) that can access the VM-H and consume the hardware service of the hardware device as provided by such VM-H; and a virtualization layer for overseeing and managing the VM-H and VM-C, the VM-H including:

a virtualization driver for receiving requests from the VM-C and initiating and performing hardware operations on behalf of the VM-C based on the requests; and a hardware stack for interfacing the virtualization driver with the hardware device and performing hardware operations with regard to the hardware device according to the requests received by the virtualization driver;

the VM-C including:

an application for transmitting a plurality of requests for the hardware service of the hardware device;

an emulating stack for interfacing the application with a trap in the virtualization layer of the computing device, the emulating stack for emulating performing of hardware operations with regard to the hardware device by way of the trap by transmitting at least some of the requests of the application to the trap, whereby the virtualization layer re-directs each request received at the trap to the virtualization driver of the VM-H, the emulating stack including a shunt driver for shunting to the virtualization driver of the VM-H all requests from the application when the VM-C is in enlightened mode, wherein each stack includes a class driver and a port driver, wherein the shunt driver in the emulating stack is positioned between the class driver and the port driver of such emulating stack and shunts the request to the port driver of an enlightened stack, whereby each shunted request bypasses the trap of the virtualization layer.

7. The computing device of claim 6 wherein the hardware device is one of a piece of hardware and an adapter for accessing a piece of hardware.

8. The computing device of claim 6 wherein the VM-C and the VM-H can communicate by way of a virtual machine bus.

9. The computing device of claim 6 wherein the shunt driver is instantiated within the emulating stack when the VM-C moves from an emulating mode into an enlightened mode where the shunt driver operates to shunt at least some of the requests.

10. The computing device of claim 6 wherein each request is classified as one of a primary request and a secondary request, each primary request being considered of primary importance and each secondary request being considered of secondary importance, and wherein the shunt driver shunts each primary request to the virtualization driver and allows each secondary request to pass to the trap.

* * * * *